(12) United States Patent
Pusdesris et al.

(10) Patent No.: US 11,416,404 B2
(45) Date of Patent: Aug. 16, 2022

(54) PREFETCHING AT DYNAMICALLY DETERMINED OFFSETS

(71) Applicant: Arm Limited, Cambridge (GB)

(72) Inventors: Joseph Michael Pusdesris, Austin, TX (US); Alexander Cole Shulyak, Austin, TX (US)

(73) Assignee: Arm Limited, Cambridge (GB)

(*) Notice: Subject to any disclaimer, the term of this patent is extended or adjusted under 35 U.S.C. 154(b) by 273 days.

(21) Appl. No.: 16/743,399

(22) Filed: Jan. 15, 2020

(65) Prior Publication Data
US 2021/0216461 A1    Jul. 15, 2021

(51) Int. Cl.
*G06F 12/00* (2006.01)
*G06F 12/0862* (2016.01)
*G06F 9/50* (2006.01)
*G06F 12/14* (2006.01)

(52) U.S. Cl.
CPC ........ *G06F 12/0862* (2013.01); *G06F 9/5005* (2013.01); *G06F 9/5061* (2013.01); *G06F 12/145* (2013.01)

(58) Field of Classification Search
CPC .. G06F 12/0862; G06F 9/5005; G06F 9/5061; G06F 12/145
See application file for complete search history.

(56) References Cited

U.S. PATENT DOCUMENTS

| | | | | |
|---|---|---|---|---|
| 2009/0113141 A1* | 4/2009 | Bullman | ............... | G06F 11/004 711/147 |
| 2015/0026414 A1* | 1/2015 | Kalamatianos | ..... | G06F 12/0862 711/137 |

* cited by examiner

*Primary Examiner* — Gurtej Bansal
(74) *Attorney, Agent, or Firm* — Nixon & Vanderhye P.C.

(57) ABSTRACT

There is provided a data processing apparatus comprising table circuitry to store a table that indicates, for a program counter value of an instruction that performs a memory access operation at a memory address, one or more offsets of the memory address and an associated confidence for each of the one or more offsets. Prefetch circuitry prefetches data based on each of the offsets in dependence on the associated confidence. Each of the offsets of the memory address is dynamically determined.

14 Claims, 6 Drawing Sheets

| PC | Offset0 | Confidence0 | Offset1 | Confidence1 | Offset2 | Confidence2 |
|---|---|---|---|---|---|---|
| 0x54F23 | -280 | 7 | 1024 | 0 | 260 | 2 |
| 0x00F40 | -92 | 3 | -90 | 6 | 40 | 1 |

FIG. 4

PREFETCHING AT DYNAMICALLY DETERMINED OFFSETS

TECHNICAL FIELD

The present disclosure relates to data processing. More particularly, it relates to prefetching.

DESCRIPTION

Due to the latency associated with accessing memory, it is often desirable to 'prefetch' data from a memory into a cache based on predictions of data that is likely to be accessed soon. However, it can be difficult to notice such patterns when the memory accesses span across memory regions. For instance, two contiguous memory addresses in virtual memory could be distant in physical memory.

SUMMARY

Viewed from a first example configuration, there is provided a data processing apparatus comprising: table circuitry to store a table that indicates, for a program counter value of an instruction that performs a memory access operation at a memory address, one or more offsets of the memory address and an associated confidence for each of the one or more offsets; and prefetch circuitry to prefetch data based on each of the offsets in dependence on the associated confidence, wherein each of the offsets of the memory address is dynamically determined.

Viewed from a second example configuration, there is provided a data processing method comprising: storing a table that indicates, for a program counter value of an instruction that performs a memory access operation at a memory address, one or more offsets of the memory address and an associated confidence for each of the one or more offsets; and prefetching data based on each of the offsets in dependence on the associated confidence, wherein each of the offsets of the memory address is dynamically determined.

Viewed from a third example configuration there is provided a data processing apparatus comprising: means for storing a table that indicates, for a program counter value of an instruction that performs a memory access operation at a memory address, one or more offsets of the memory address and an associated confidence for each of the one or more offsets; and means for prefetching data based on each of the offsets in dependence on the associated confidence, wherein each of the offsets of the memory address is dynamically determined.

BRIEF DESCRIPTION OF THE DRAWINGS

The present invention will be described further, by way of example only, with reference to embodiments thereof as illustrated in the accompanying drawings, in which:

FIG. 4 shows an example of the table structure for showing offsets and associated confidences in accordance with some examples;

DESCRIPTION OF EXAMPLE EMBODIMENTS

Figure 1:
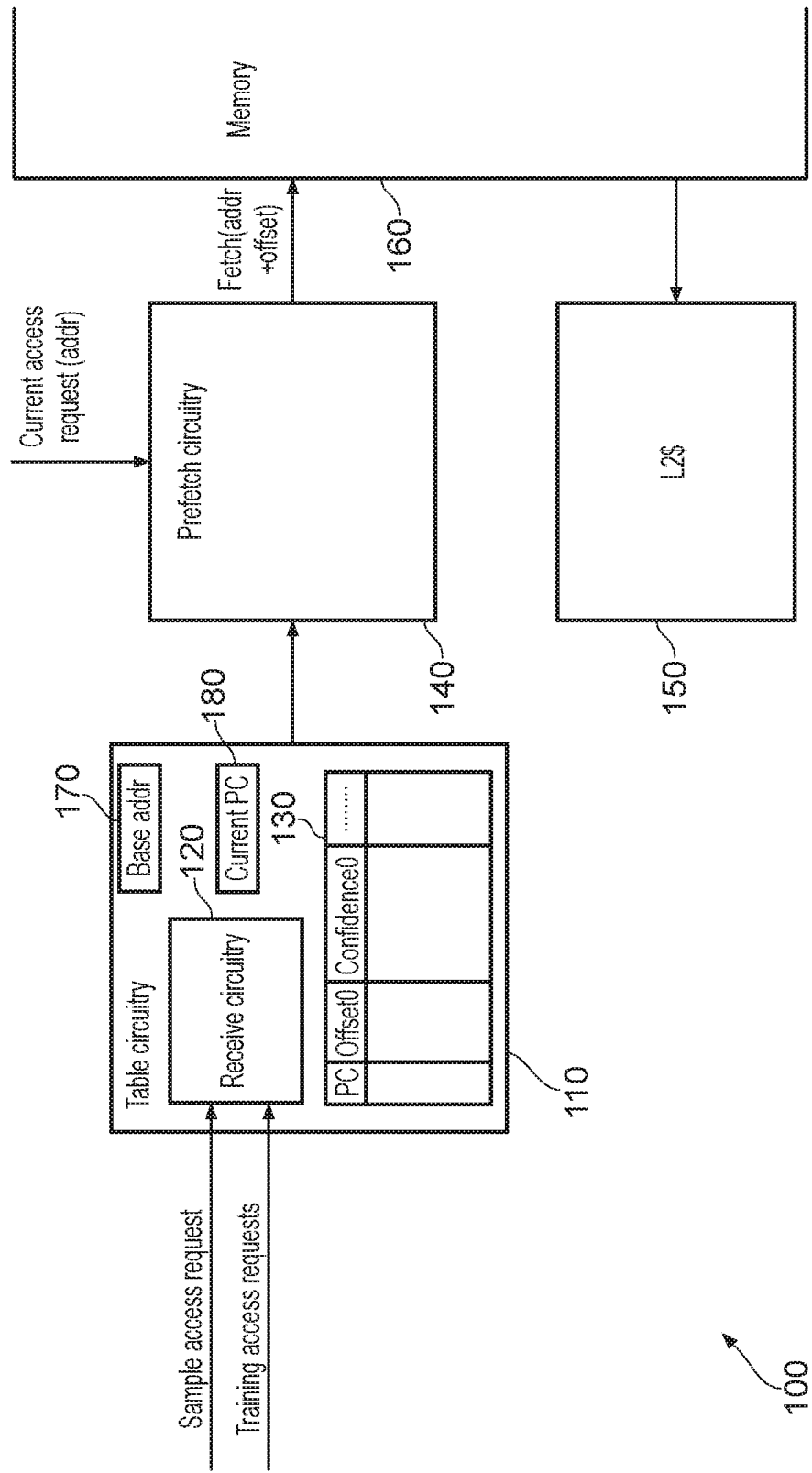
FIG. 1 schematically illustrates a data processing apparatus in accordance with some embodiments.

Before discussing the embodiments with reference to the accompanying figures, the following description of embodiments is provided.

In accordance with one example configuration, there is provided a data processing apparatus comprising: table circuitry to store a table that indicates, for a program counter value of an instruction that performs a memory access operation at a memory address, one or more offsets of the memory address and an associated confidence for each of the one or more offsets; and prefetch circuitry to prefetch data based on each of the offsets in dependence on the associated confidence, wherein each of the offsets of the memory address is dynamically determined.

In the above aspect, the table circuitry tracks offsets of a base memory address, with the offsets corresponding to further memory addresses that are accessed. Each of the offsets has an associated confidence—e.g. an indication of how likely an offset address is to be accessed when the base address is accessed. Based on these confidences, decisions can be made as to which addresses should be prefetched in the future. For instance, if the confidence for an offset is low then it may be unlikely that a prefetch occurs on data stored at such an offset, whereas if the confidence for an offset is high then it may be likely that data stored at such an offset is prefetched. In the above examples, the offsets are dynamically determined. That is to say that the table circuitry is not limited to tracking specific offsets and can instead track offsets arbitrarily. In this way, even if the magnitude of the offsets is particularly large (e.g. distant in either a forward or a negative direction from the base address) it is still possible to track those offsets, assign an appropriate confidence, and make decisions as to whether data stored at those offsets should be prefetched.

In some examples, the data processing apparatus comprises: receive circuitry to receive one or more training memory access requests to training memory addresses occurring after a sample memory access request at a sample program counter, wherein the sample memory access request is made to a sample memory address in storage circuitry; and the offsets are dynamically determined by calculating differences between each of the training memory addresses and the sample memory address. The sample memory address request is made to a sample memory address, which acts as a base address for the one or more training (further) memory access requests to training memory addresses. In other words, the offsets are calculated as the difference between the training memory addresses and the sample memory addresses. These differences can be calculated by a simple subtraction between the two addresses. Meanwhile, the sample program counter refers to a program counter value at which an instruction corresponding to the sample memory access request occurred. This way, once the offsets are calculated, they can be stored in association with the sample program counter in the table of the table circuitry. Again, since the offsets are dynamically determined rather than being statically determined, there is no obligation for the training memory access requests and the sample memory access request to have a particular relationship in respect of the addresses that are accessed.

This therefore increases the range of offsets that can be determined by the circuitry. In some embodiments, there may be multiple simultaneous sample memory addresses each directed to a different sample memory address. In this situation, offsets are calculated as the differences between each training memory address and each sample memory address.

In some examples, for each difference in the differences, if the difference is stored as an offset in the offsets in the table circuitry at a row of the table where the program counter value is equal to the sample program counter, then the associated confidence of that offset in the row is increased. Having determined a particular difference, it is possible to search the table circuitry table for an entry where the program counter value corresponds to the sample program counter. If the offset in question is located in that entry, the associated confidence of that offset in the entry is increased. This corresponds with the situation in which a particular offset that is already known has been seen again. Consequently, it can be assumed with higher confidence that there is a correspondence between the sample memory access and the training memory access that produces the particular offset. The confidence is therefore increased in order to represent this fact. Where multiple simultaneous sample memory accesses are in operation, each entry of the table whose program counter value corresponds with one of the sample program counters is considered.

In some examples, for each offset in the offsets, if the offset is absent from the differences at a row of the table where the program counter value is equal to the sample program counter value then the associated confidence of that offset in the row is decreased. In contrast to the above, if an offset that is listed in respect of the program counter value that corresponds with the sample program counter value is not one of the differences that has been calculated, then the associated confidence of that offset in the entry of the table is decreased. This represents the situation in which a previously encountered offset value has not been encountered in the current set of training memory access requests. Consequently, it can be assumed that it is less likely that this offset will be encountered in the future and consequently the confidence of that offset is decreased.

In some examples, for each difference in the differences, if the difference is absent from the offsets at a row of the table where the program counter value is equal to the sample program counter value and there is storage capacity to store a further offset in the row then the difference is added to the offsets of the row and the associated confidence is set to a default confidence. Where a new offset has been encountered (e.g. a difference is encountered that is not listed as one of the offsets in the corresponding entry of the table having a program counter value equal to the sample program counter value). Then if there is capacity in that entry of the table to store a further offset then the newly encountered offset is stored. Furthermore, a confidence value of that newly stored offset is set to a default value.

In some examples, the default confidence is above a minimum confidence and below a maximum confidence. The default confidence to which the newly inserted entry is set is therefore neither a minimum value of confidence or a maximum value of confidence. Instead, the default confidence lies between these two extremes. In order to represent the fact that until this point the confidence of the newly inserted entry is unknown. For instance, if confidence is measured as a 3-bit number from zero to seven, then the default confidence could be three. That is, the confidence value could be in the middle of the available range of confidence.

In some examples, for each difference in the differences, if the difference is absent from the offsets at a row of the table where the program counter value is equal to the sample program counter value and there is insufficient storage capacity to store a further offset in the row and the associated confidence of one of the offsets in the row is below a lower threshold then the one of the offsets in the row is replaced with the difference. If, when newly encountered difference cannot be added to the entry of the table due to there being insufficient storage capacity to store a further offset in that entry of the table, then it is determined whether one of the other offsets in that entry has a confidence that is below a lower threshold. If so, then that offset having the confidence below the lower threshold is replaced with the newly encountered difference. Consequently, the table in the table circuitry is set up to track (with higher priority) those offsets that are considered to be more likely to occur than those that are less likely to occur. Offsets, which are so unlikely to occur that the confidence value falls below the lower threshold, can be removed in favour of offsets that are newly encountered. Over time, it may be expected that only offsets having the higher confidences are maintained. Consequently, it is possible to inhibit using storage space to store offsets that are unlikely to result in useful prefetches occurring (useful prefetches can be considered to be prefetches that result in data being obtained that is later explicitly requested). In some embodiments, the lower threshold corresponds with a threshold that is necessary for prefetching on the offset to occur. In other embodiments, the lower threshold is below this level so that future training memory access requests could cause this confidence to be increased above the threshold at which prefetching occurs for the offset.

In some examples, the associated confidence of the one of the offsets in the row is set to a default confidence in response to the one of the offsets being replaced with the difference. Consequently, when one of the offsets is replaced with a newly encountered difference, the confidence that is assigned to the new offset (the newly encountered difference) is set to a default confidence value.

In some examples, the default confidence is above a minimum confidence and below a maximum confidence. The default confidence value is therefore above the minimum confidence and below the maximum confidence in order to represent the fact that the default confidence is unknown, as explained above.

In some examples, in response to an absence of a row in the table where the program counter value is equal to the sample program counter value, a new row is added to the table for the sample program counter value containing at least some of the differences as the offsets, wherein the associated confidence of the offsets is set to a default confidence. After having determined one or more differences, if the sample program counter value at which the sample memory access request occurred is not located in the table then a new entry or row is added to the table to represent that sample memory access request that occurred at the sample program counter value. At least some of the differences that have been determined are added as offsets, with each of those offsets being given an associated confidence of a default confidence. In some embodiments, where it is not possible to add all of the offsets, the offsets that were first detected may be selected on the assumption that such offsets are more closely associated with the sample memory access.

In some examples, the default confidence is above a minimum confidence and below a maximum confidence. Once again, the default confidence can be set at a point to represent the fact that the confidence is initially unknown rather than low or high. This makes it possible to adjust the confidence in view of analysis that takes place.

In some examples, there are a predetermined number of the training memory access requests. The predetermined number could be selected to coincide with the selection of a new sample memory address.

In some examples, the training memory access requests are explicit memory access requests; and the sample memory access request is an explicit memory access request. In these examples, the training memory access requests and the sample memory access request are all explicit memory access requests that actively request data at a particular memory address. In other words, these are all access requests that are issued actively rather than as a result of a prefetch process. Consequently, the data processing apparatus can be used in order to predict offsets for memory accesses that would otherwise not be prefetched if not for the data processing apparatus. In these embodiments, the data processing apparatus can therefore be used alongside other prefetching systems in order to improve the overall success rate of prefetching.

In some examples, wherein the storage circuitry is logically divided into a plurality of regions, wherein each of the regions has an associated owner; and at least some of the training memory addresses are in different regions having a same associated owner, separated by one of the regions having a different associated owner. Regions of the storage circuitry can be divided such that each region is associated with a particular owner or accessor (such as an execution environment such as process, thread or virtual machine). Each process can be given a view of the memory that only covers regions of the memory to which that accessor has access. In this way, the view of memory provided to each accessor excludes areas of memory that that accessor cannot access. However, as a consequence of this, it is possible for two apparently adjacent areas of memory to actually be separated. In particular, if the view of memory that is provided to an execution environment contains two consecutive addresses, with each of the addresses pointing to a different region of memory that is separated by a further region of memory having a different associated accessor, then the areas of memory that are actually accessed could be distant. Such a situation occurs with the use of virtual memory. As a consequence of this, it is possible for the offsets between a sample memory access and a training memory access to be very far apart. In the current embodiments, since the offsets are dynamically determined rather than being fixed within a particular range, it is possible for such offsets to be detected and used to influence the prefetching process.

In some examples, the prefetch circuitry is adapted to prefetch data stored at each offset in the offsets when the associated confidence of that offset is above a threshold value. The decision of whether data should be prefetched or not therefore depends on the confidence that is associated with a particular offset. In particular, if the associated confidence for a particular offset is above a threshold value then it may be determined that there is value to prefetching at that offset since it is likely that the data stored at that location is likely to be used.

In some examples, each row of the table is to store, in association with the program counter value, at least one pair of fields; a first field in the pair of fields is to store a value of one of the one or more offsets; and a second field in the pair of fields is to store the associated confidence of the one of the one or more offsets. One way in which the offsets can be dynamically determined is by storing, in each row of the table that is associated with a particular program counter value, pairs of fields. The first field in each pair refers to a particular offset value and the second field indicates the confidence that is associated with that offset value. It is therefore possible for each entry of the table to store confidences in association with arbitrary offsets.

In some examples, the prefetch circuitry is adapted to prefetch data based on an offset in the offsets by prefetching data at a location equal to a current access address adjusted by the offset. When later memory access requests are made (including the current access made to a current access address) the prefetch circuitry prefetches data at other prefetch addresses related to the current access address. In particular, each of these prefetch addresses is calculated by taking the current access address and by adding one of the offsets. Data at the resulting addresses is then pre-emptively fetched (e.g. even though no explicit request for the data at that address has been made). Note that it is not necessary for all of the offsets to be used for prefetching. In particular, in some embodiments, the set of offsets is firstly filtered so that only offsets meeting a particular requirement are used in the calculation of addresses that are to be prefetched. For instance, it could be the case that only offsets having a confidence above a threshold are used in prefetching.

Particular embodiments will now be described with reference to the figures.

FIG. 1 schematically illustrates an apparatus 100 in accordance with some examples. The apparatus 100 includes table circuitry 110, which includes a table 130 that stores program counter values in association with offsets and confidences of those offsets. The table circuitry 110 includes receive circuitry 120 that includes a sample access request. The receive circuitry 120 also receives a number of following training access requests. The memory address that is accessed by the sample access request is stored in a base address register 170. Similarly, the program counter value of the sample access request is stored in a current program counter value register 180. The training access requests that follow the sample access request have their memory addresses compared to this base address in order to determine a set of differences. These differences are then used to affect the offsets and confidences for an entry in the table 130 that corresponds with the program counter value stored in the current program counter value register 180.

The offsets and confidences stored in the table 130 are used by prefetch circuitry 140 in order to determine memory addresses in a memory 160 that should be fetched in response to current access requests. In particular, in response to a current access request to a memory address ADDR, the prefetch circuitry 140 may look at the offsets associated with the program counter value of the current access request to determine whether any of those offsets have a corresponding confidence above a threshold value. For each of the offsets whose confidence falls above a default value, a fetch is made to memory for the data stored at an address derived by adding the address ADDR to the offset. Any data that is returned by the memory 160 in response to such a fetch request is stored in a cache such as a level 2 cache 150.

It will be appreciated that, as a consequence of the table 130 storing pairs of offsets and confidences for each program counter value, it is possible for the offsets to be arbitrarily determined. That is to say that the offsets are dynamically determined and are not statically fixed as one of several possible values. It is therefore possible for the prefetch circuitry 140 to prefetch addresses having both very large and very small offsets (in either a positive or negative direction) for a single current access request.

Figure 2:
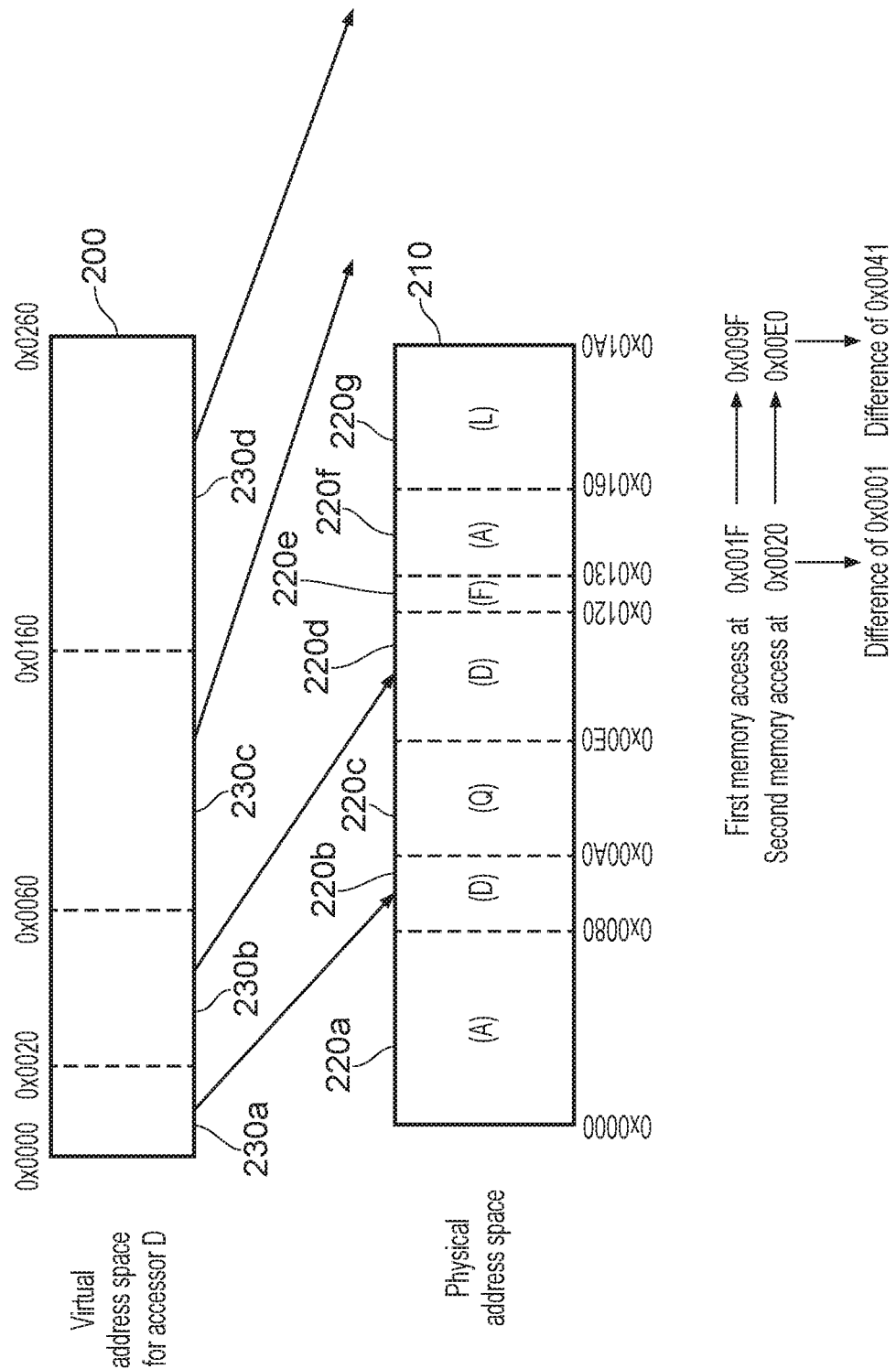
FIG. 2 shows an example of memory boundaries in accordance with some embodiments.

FIG. 2 illustrates, in accordance with some examples, a situation in which the offset may be large. In FIG. 2, a virtual address space is provided for an owner/accessor (execution environment such as a process) D 200. This space could be the accessor's only view of memory and may be specific to that accessor. The virtual address space 200 comprises a number of regions 230a, 230b, 230c, 230d, each of which corresponds with a region of memory identified by a physical address space 210. The physical address space 210 corresponds with the addresses provided to the physical hardware. The physical address space 210 also contains a number of memory regions 220a, 220b, 220c, 220d, 220e, 220f, 220g. Each of these regions 220a, 220b, 220c, 220d, 220e, 220f, 220g is also associated with a different accessor (execution environment). Since the virtual address space for an accessor D 200 may only refer to those regions of physical memory that are assigned to the accessor D, the virtual address space 200 differs from the physical address space 210. In fact, it will be noted that two regions 230a, 230b of the virtual address space for accessor D 200 that are contiguous correspond with non-contiguous regions 220b, 220d in the physical address space 210. This is because a further region 220c of the physical address space, not assigned to accessor D, interleaves the two regions 220b, 220d that are assigned to accessor D. This interleaving region 220c is assigned to a different accessor Q.

Consequently, consider a situation in which a memory access is made to the virtual address 0x001F. This address will correspond with the physical address 0x009F. If a second memory access is made to the virtual address 0x0020, this will be translated to the physical address space 0x00E0. Consequently, even though there is only a difference of 0x001 in respect of the virtual address space 200, there is a difference of 0x0041 in respect of the physical address space 210. Phrased differently, two memory addresses that appear to be adjacent in the virtual address space 200 are non-adjacent in the physical address space 210. Hence, in a system in which the possible physical offsets that can be determined are statically fixed, such a system may not be able to detect a difference of such a magnitude. Consequently, even though accesses may be made to addresses 0x001F and 0x0020 as a pair, the prefetch circuitry may be incapable of detecting and responding to this pattern. Opportunity to prefetch such data is therefore lost and the system may act inefficiently as a consequence of having to retrieve this data from memory rather than from a much faster cache in the hierarchy.

In the present examples, since the offsets can be dynamically determined (e.g. are not limited and can be arbitrarily chosen), the offset can be detected and where appropriate can be used to inform the prefetch decision making process.

Figure 3:
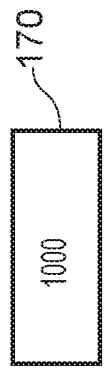
FIG. 3 illustrates a data structure suitable for storing differences that are calculated during memory accesses in accordance with some examples.
Figure 3:
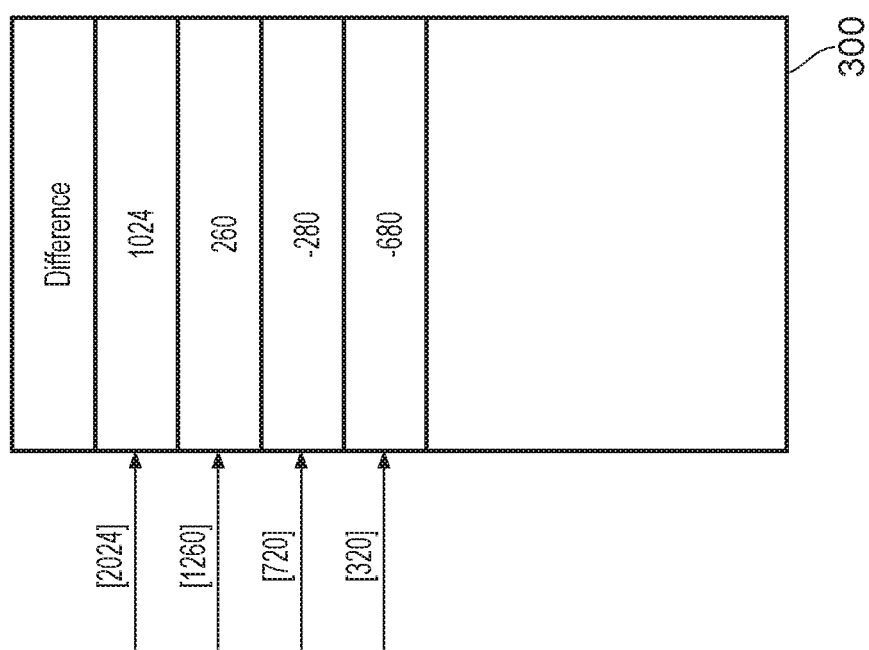

FIG. 3 illustrates a queue 300, which is used to track differences in memory accesses between a sample access request address and each of the training access request addresses. In this example, it is assumed that only a single sample access request address is active at any time. However, in other examples, there may be multiple active sample access addresses. The differences can be stored in a single queue or could be stored in multiple different queues (one for each sample access address). Also in this example, the base address, which is the address accessed by the sample access request, is stored in a base address register 170. Thereafter, each of the training access requests that occur is compared to the base address and are stored in the queue 300. For instance, when a first training access request is received that accesses an address (2024), the difference is calculated as 2024−1000=1024. Furthermore, when an address [1268] is accessed by a second training access request, the difference is calculated as 1260−1000=260. When a third training access request is received, which accesses an address [720], the difference is calculated as 720−1000=−280. When a fourth training access request is received, which accesses an address [320], the difference is calculated as 320−1000=−680. Consequently, the queue 300 tracks these differences in respect of the sample access request. Once again, where multiple sample access addresses are active at the same time, multiple such registers can be provided.

The calculated differences can then be used in order to populate or alter the values stored in the table 130. FIG. 4 illustrates an example of the table 130. In particular, the table is made up of columns including a program counter value 400, a first offset value 410, a first confidence value associated with that offset value 420, a second offset value 430, a second confidence value associated with the second offset value 440, a third offset value 450, and a third confidence value associated with that offset value 460. In other words, for a given program counter value 400 at which a sample memory access occurs, the table includes a number of pairs of offsets and associated confidences.

As previously explained, the differences that were calculated in the queue 300 shown in FIG. 3 are used to affect the table 130 in FIG. 4. For instance, if the program counter value of the sample access request on which the differences in the queue 300 were calculated is 0x54F23, then a first line 470 of the table 130 in FIG. 4 would be affected. In particular, the differences 1024, 260, and −280 are already listed as offsets in this row 470. Since these differences are listed in the queue 300, the confidence associated with each of those offsets is incremented in the row 470. For instance, a first confidence value 420 could be incremented by 1 to 8, a second confidence value 440 could be incremented by 1 to 1, and a third confidence value 460 could be incremented by 1 to 3. It is noted that a fourth difference (−680) in the queue 300 is also detected. In this example, there is no further storage space in the row 470 for this offset to be stored. However, it will be appreciated that the second confidence value 440 associated with the second offset value 430 is extremely low (originally 0 and incremented to 1). If this confidence is below a threshold value, then this offset could be deleted and replaced with an entry for the newly discovered difference (−680). The associated confidence value can be set to a default confidence value. It may be appropriate for this default confidence value to be neither a minimum value nor a maximum value, but instead to lie between these two extremes in order to represent the fact that the confidence of the newly inserted offset is currently unknown. If storage space was available in this entry 470, then the offset could be added. Again, the default confidence value could be added for such a newly added offset. In addition, if the program counter value 400 corresponding with the sample access request was not located in the table 130, then a new entry could be added with all or some of the differences that were detected. Once again, each of the offsets could be assigned a default confidence value that is midway between the extremes of highly confident and not at all confident. In a situation in which a large number of differences were detected, such that not all of the differences can be added as offsets to the table 130, there are a number of different ways in which this can be handled. One way of handling it would be the take the first N differences listed in the queue 300, where N is the number of different offsets that can be added for a single entry in the table 130.

In addition to the above explanation, the confidences associated with different offsets can also be decreased. In particular, consider a situation in which the program counter value of the sample access request corresponded with 0x00F40, which is found in a second entry 480 of the table 130. In this situation, none of the offsets that are listed (−92, −90, 40) are listed in the differences of the queue 300. Consequently, each of the associated confidences for the entry 480 would be decreased. The first confidence 420 would be decreased from 3 to 2, the second confidence 440 would be decreased from 6 to 5, and the third confidence 460 would be decreased from 1 to 0. As previously explained, this decrease of confidence can result in entries being replaced.

Note that there is no need for the increment to be an increment of one and there is no need for the decrement to be a decrement of one. In other examples, the increase of decrease that is applied to each confidence value could be arbitrarily selected. In particular, the increase could be by a larger amount or by a smaller amount than the decrease so that the process is made more tolerant of offsets that are temporarily not seen.

Figure 5:
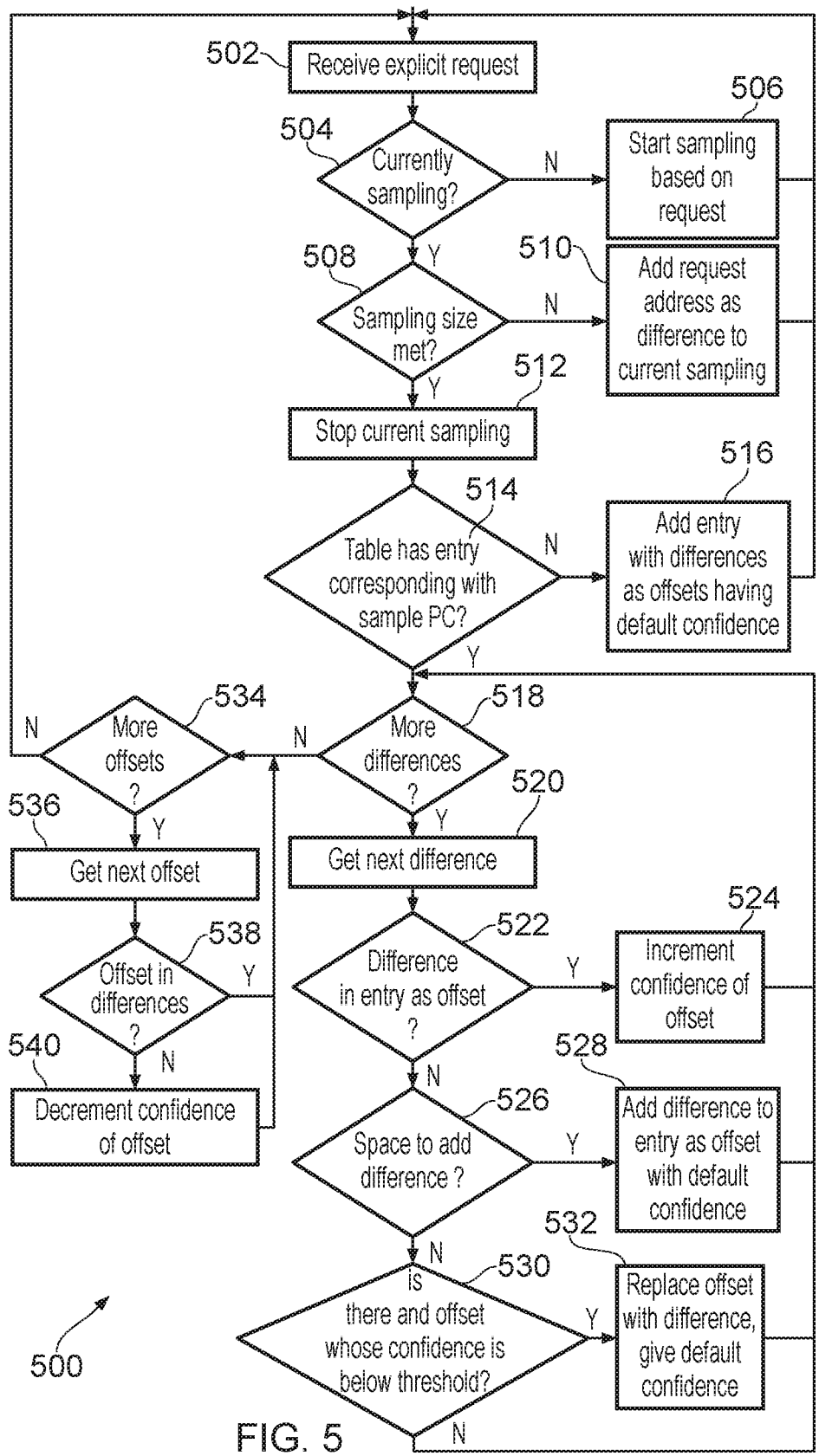
FIG. 5 provides a flowchart that shows a process for updating the table containing offsets and confidences in accordance with some examples.

FIG. 5 illustrates a flow chart 500 that shows a process of handling sample access requests and training access requests for modifying the table 130. The process begins at a step 502 in which an explicit request is received. In other words, the requests being handled in this example by the apparatus 100 exclude access requests that are made by other prefetchers. At a step 504, it is determined whether the apparatus 100 is currently sampling. If not, then at step 506, sampling begins based on the request. Consequently, the program counter value of the received explicit request is stored in the current program counter value register 180, and the address of the received explicit request to be accessed is stored in the base address register 170. The process then returns to step 502. If, at step 504, sampling is occurring, then at step 508 it is determined whether the sampling size is met. In particular, if the number of training access requests that have been received since the sample access request was received falls below a threshold, then a difference is calculated and stored in the queue 300 as previously described with respect to FIG. 3. The process then returns to step 502. Otherwise, the process proceeds to step 512 where the current sampling is stopped. At step 514, an analysis of the differences that were calculated during the sampling process is performed. In particular, at step 514 it is determined whether the table 130 already has an entry that corresponds with the sample access request program counter value stored in the current program counter value register 180. If not, then an entry is added to the table in step 516. The entry uses the program counter value stored in the current program counter value register 180, the offsets correspond with the differences that are stored in the queue 300, and a confidence value for each of the offsets is set to a default confidence value. If, at step 514, an entry already exists in the table, then at step 518 a loop begins through each of the differences stored in the queue 300. Step 518 asks whether there are more differences stored in the queue 300 to be analysed. If so, then at step 520, the next difference in the queue 300 is obtained. At step 522, it is determined whether this difference is stored as an offset in the relevant entry of the table 130. That is, for the entry of the table 130 having a program counter value corresponding with the current program counter value stored in the current program counter value register 180, it is determined whether one of the listed offsets corresponds with the current difference being analysed. If so, then at step 524, the confidence of that offset is incremented and the process returns to step 518. If not, then the process proceeds to step 526, where it is determined whether there is space to add this difference to the entry. If so, then at step 528, the difference is added to the entry as a new offset having a default confidence value. The process then returns to step 518. Otherwise, the process proceeds to step 530, where it is determined whether there is an offset whose confidence is below the minimum threshold in the current entry. If so, then at step 532, that offset is replaced with the current difference and the default confidence is assigned to that offset. The process then returns to step 518. Similarly, if there is not an offset whose confidence is below the minimum threshold at step 530, then the process also returns to step 518 in recognition of the fact that there is no space to add this difference to the current entry. If, at step 518, there are no further differences in the queue 300 to be considered, then at step 534 a second loop begins to consider each of the offsets that are stored in the entry of the table 130. In particular, at step 534, it is determined whether there are more offsets to be considered. If so, then at step 536 the next offset is obtained. At a step 538, it is determined whether that offset is listed in the set of differences that are calculated in the queue. If so, then the process returns to step 534. Otherwise, the process proceeds to step 540 where the confidence of that offset is decremented. This corresponds with the situation in which a particular offset was not detected in the current set of differences and therefore the confidence value is decreased. If, at step 534, there are no further offsets to be considered, then the process returns to step 502.

Figure 6:
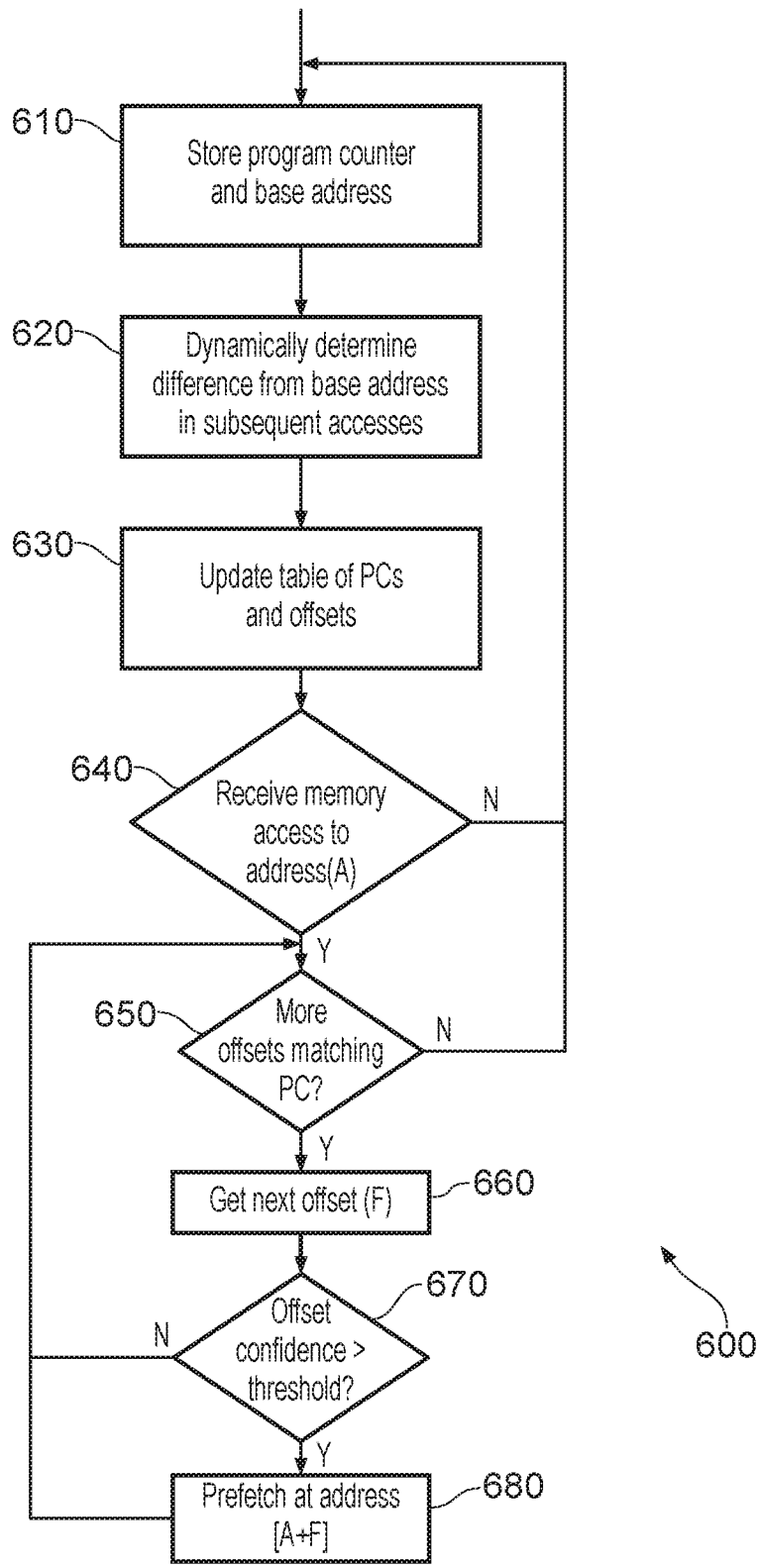
FIG. 6 shows, in the form of a flowchart, a method of data processing in accordance with some examples.

FIG. 6 illustrates a method of data processing in accordance with some embodiments. The process is illustrated in the form of a flow chart 600. At a step 610, a program counter value and base address of a sample access request are stored. For instance, these could be stored in a base address register 170 and a program counter value register 180 as previously described. At step 620, differences are dynamically determined based on the base address 170 and addresses accessed by one or more training access requests that are received by the receive circuitry 120. At step 630, the table 130 is updated based on the differences that are determined. At a step 640, a current memory access request to a memory address A may be received. If not, then the process returns to step 610. If so, then at step 650, the program counter value of the current access request is looked up in the table 130. The loop then begins to consider each of the offsets listed in that entry. Step 650 asks whether there are further offsets remaining. If not, then the process returns to step 610. If so, then at step 660, the next offset F is considered. Step 670 determines whether the confidence associated with offset F is above a threshold value. If not, then the process returns to step 650. If so, then the process proceeds to step 680 where a prefetch of the data stored at an address [A+F] occurs. In other words, data that is offset from the address of the current access request by one of the offsets listed in the table entry corresponding with the current access request is fetched from memory 160 into the cache 150.

In accordance with the preceding, it is possible to dynamically determine a set of offsets associated with a sample access requests. If the offsets are dynamically determined, it is possible for prefetching to occur on addresses regardless of the apparent distance between the physical locations at which the data in those requests is stored. As a consequence of this, is it possible to perform prefetching even across region boundaries. For example, this could occur across regions of virtual memory that are non-contiguous and where the physical addresses are distant.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
    table circuitry to store a table that indicates, for a program counter value of an instruction that performs a memory access operation at a memory address, one or more offsets of the memory address and an associated confidence for each of the one or more offsets;
    prefetch circuitry to prefetch data based on each of the offsets in dependence on the associated confidence; and
    receive circuitry to receive one or more training memory access requests to training memory addresses occurring after a sample memory access request at a sample program counter, wherein the sample memory access request is made to a sample memory address in storage circuitry, wherein
    the data processing apparatus is adapted to dynamically determine each of the offsets of the memory address by calculating differences between each of the training memory addresses and the sample memory address; and
    for each difference in the differences, if the difference is absent from the offsets at a row of the table where the program counter value is equal to the sample program counter value and there is insufficient storage capacity to store a further offset in the row and the associated confidence of one of the offsets in the row is below a lower threshold, then the data processing apparatus is adapted to replace the one of the offsets in the row with the difference.

2. The data processing apparatus according to claim 1, wherein
    for each difference in the differences, if the difference is stored as an offset in the offsets in the table circuitry at a row of the table where the program counter value is equal to the sample program counter, then the associated confidence of that offset in the row is increased.

3. The data processing apparatus according to claim 1, wherein
    for each offset in the offsets, if the offset is absent from the differences at a row of the table where the program counter value is equal to the sample program counter value then the associated confidence of that offset in the row is decreased.

4. The data processing apparatus according to claim 1, wherein
    there are a predetermined number of the training memory access requests.

5. The data processing apparatus according to claim 1, wherein
    the training memory access requests are explicit memory access requests; and
    the sample memory access request is an explicit memory access request.

6. The data processing apparatus according to claim 1, wherein
    the storage circuitry is logically divided into a plurality of regions, wherein each of the regions has an associated owner; and
    at least some of the training memory addresses are in different regions having a same associated owner, separated by one of the regions having a different associated owner.

7. The data processing apparatus according to claim 1, wherein
    the prefetch circuitry is adapted to prefetch data stored at each offset in the offsets when the associated confidence of that offset is above a threshold value.

8. The data processing apparatus according to claim 1, wherein
    each row of the table is to store, in association with the program counter value, at least one pair of fields;
    a first field in the pair of fields is to store a value of one of the one or more offsets; and
    a second field in the pair of fields is to store the associated confidence of the one of the one or more offsets.

9. The data processing apparatus according to claim 1, wherein
    the prefetch circuitry is adapted to prefetch data based on an offset in the offsets by prefetching data at a location equal to a current access address adjusted by the offset.

10. The data processing apparatus according to claim 1, wherein
    the associated confidence of the one of the offsets in the row is set to a default confidence in response to the one of the offsets being replaced with the difference.

11. The data processing apparatus according to claim 10, wherein
    the default confidence is above a minimum confidence and below a maximum confidence.

12. A data processing apparatus comprising:
    table circuitry to store a table that indicates, for a program counter value of an instruction that performs a memory access operation at a memory address, one or more offsets of the memory address and an associated confidence for each of the one or more offsets;
    prefetch circuitry to prefetch data based on each of the offsets in dependence on the associated confidence; and
    receive circuitry to receive one or more training memory access requests to training memory addresses occurring after a sample memory access request at a sample program counter, wherein the sample memory access request is made to a sample memory address in storage circuitry, wherein
    the data processing apparatus is adapted to dynamically determine each of the offsets of the memory address by calculating differences between each of the training memory addresses and the sample memory address;

for each difference in the differences, if the difference is absent from the offsets at a row of the table where the program counter value is equal to the sample program counter value and there is storage capacity to store a further offset in the row, then the data processing apparatus is adapted to add the difference to the offsets of the row and to set the associated confidence to a default confidence; and the default confidence is above a minimum confidence and below a maximum confidence.

13. A data processing apparatus comprising:

table circuitry to store a table that indicates, for a program counter value of an instruction that performs a memory access operation at a memory address, one or more offsets of the memory address and an associated confidence for each of the one or more offsets;

prefetch circuitry to prefetch data based on each of the offsets in dependence on the associated confidence; and receive circuitry to receive one or more training memory access requests to training memory addresses occurring after a sample memory access request at a sample program counter, wherein the sample memory access request is made to a sample memory address in storage circuitry, wherein the data processing apparatus is adapted to dynamically determine each of the offsets of the memory address by calculating differences between each of the training memory addresses and the sample memory address; and in response to an absence of a row in the table where the program counter value is equal to the sample program counter value, the data processing apparatus is adapted to add a new row to the table for the sample program counter value containing at least some of the differences as the offsets, wherein the data processing apparatus is adapted to set the associated confidence of the offsets to a default confidence;

the default confidence is above a minimum confidence and below a maximum confidence.

14. A data processing method comprising:

storing a table that indicates, for a program counter value of an instruction that performs a memory access operation at a memory address, one or more offsets of the memory address and an associated confidence for each of the one or more offsets; and prefetching data based on each of the offsets in dependence on the associated confidence;

receiving one or more training memory access requests to training memory addresses occurring after a sample memory access request at a sample program counter, wherein the sample memory access request is made to a sample memory address in storage circuitry, wherein each of the offsets of the memory address is dynamically determined by calculating differences between each of the training memory addresses and the sample memory address; and determining that one of the differences is absent from the offsets at a row of the table where the program counter value is equal to the sample program counter value and that there is insufficient storage capacity to store a further offset in the row and the associated confidence of one of the offsets in the row is below a lower threshold, and in response to the determining, replacing the one of the offsets in the row with the one of the differences.

\* \* \* \* \*